Oct. 12, 1965     C. C. PEAKE ETAL     3,210,912
REMOVAL OF SOLUBLE GASES FROM A STEAM
GENERATOR FEEDWATER SYSTEM
Filed Sept. 23, 1963     2 Sheets-Sheet 1

INVENTORS
Charles C. Peake and
Joseph R. Spencer
BY

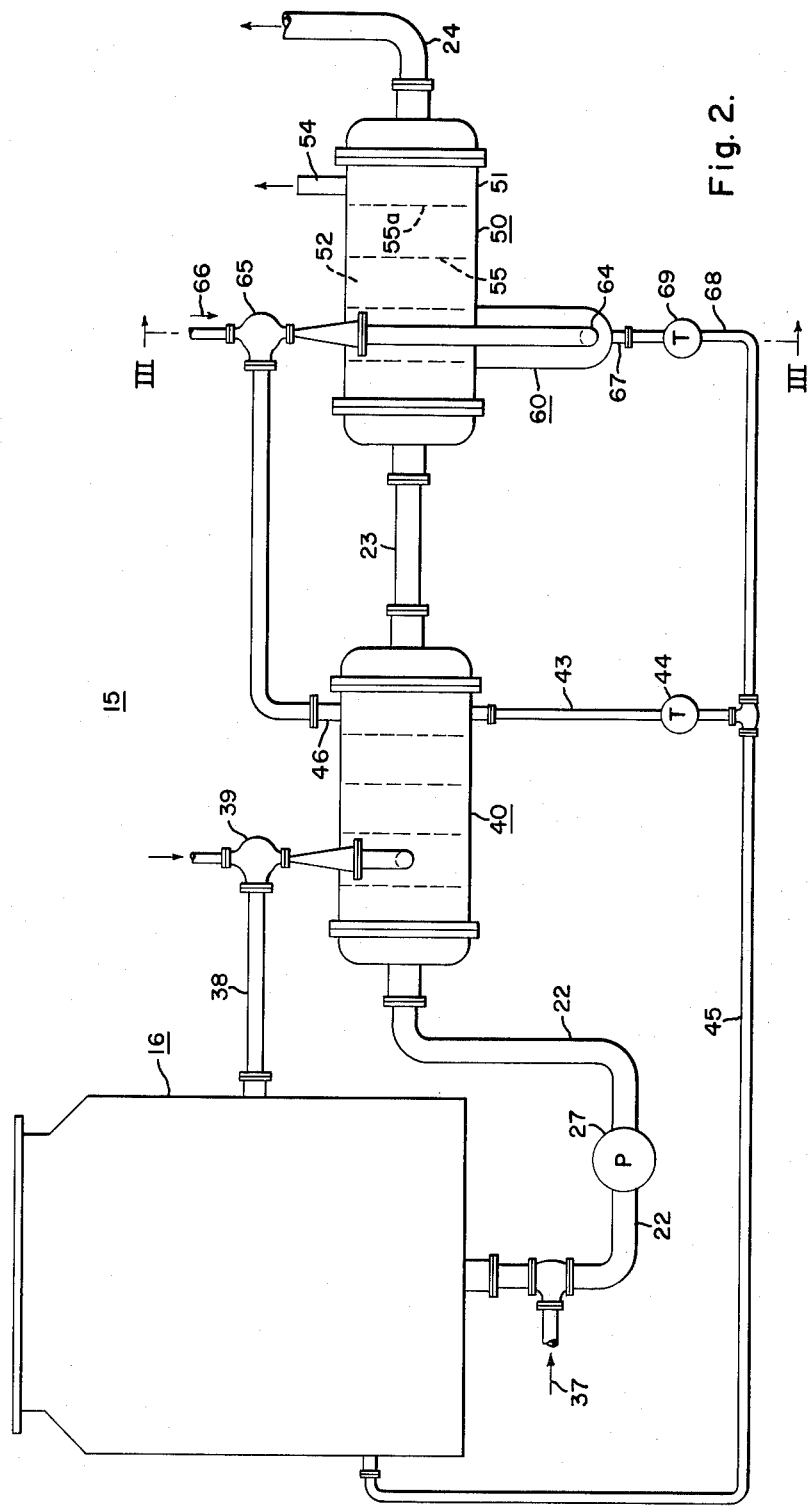

United States Patent Office

3,210,912
Patented Oct. 12, 1965

3,210,912
REMOVAL OF SOLUBLE GASES FROM A STEAM GENERATOR FEEDWATER SYSTEM
Charles C. Peake, Media, and Joseph R. Spencer, Chester, Pa., assignors to Westinghouse Electric Corporation, Pittsburgh, Pa., a corporation of Pennsylvania
Filed Sept. 23, 1963, Ser. No. 310,629
10 Claims. (Cl. 55—39)

This invention relates to degasification of liquids, more particularly to removal of highly soluble gases from a liquid having such gases at least partly in solution, and has for an object to provide an improved method and apparatus for effecting the above.

Modern high pressure steam turbine power plants now employ chemicals such as amines to control the pH value of the feedwater for a steam generator, such as a boiler. However the amines have a tendency to break down and liberate free ammonia gas. The presence of the ammonia in the steam and/or in solution with the steam generator feedwater is highly undesirable because of its corrosiveness to copper bearing materials which are commonly used. Accordingly, several schemes have been proposed to remove the ammonia from the exhaust steam from the turbine, together with air and other incondensible gases, during condensation of the steam in the condenser. However since ammonia is extremely soluble in water, such deaeration schemes, even though staged to employ deaeration in subsequent condensers, require that considerable condensate be removed from the system to insure that the ammonia is not returned to the system. Since the steam generator feedwater is necessarily of extremely high purity, such loss of condensate must be replaced by additional or "make-up" water of high purity at considerable expense.

In view of the above, it is a further object of this invention to provide an improved method and apparatus for removing ammonia from a steam generator feedwater system.

Another object is to provide a method and apparatus for removing ammonia from a steam generator feedwater system that minimizes the amount of steam or feedwater bled from the system, yet insures that substantially all of the ammonia is bled from the feedwater before admitting to the steam generator.

Briefly, in accordance with the invention, in a steam generator feedwater system for a steam turbine power plant, the main condenser for condensing exhaust steam from the turbine is provided with steam assisted deaerating means to vent incondensible gases such as air together with any ammonia gas present. The vented gases (steam, air and ammonia) are then directed to a second condenser wherein they are vented to atmosphere after sub-cooling to condense and minimize loss of water from the system.

However, during sub-cooling some of the ammonia goes back into solution with the collecting condensate. To remove this ammonia from the condensate, the second condenser is provided with a depending tubular degasifying structure having its upper end in communication with the drain collecting section of the second condenser and its lower end portion in communication with a liquid drain conduit. The outlet of the steam assisted deaerating device is disposed in communication with the degasifying structure so that, as the sub-cooled ammonia and condensate solution flows downwardly therethrough from the drain section of the second condenser, the solution intermingles with and is heated to its saturation temperature by the upwardly directed incoming steam and the ammonia is again released. The thus released ammonia is returned to the second condenser (together with newly admitted air, steam and ammonia) thereby enriching the atmosphere in the second condenser with ammonia, while the thus purified condensate is drained from the degasifier by the drain conduit.

This cycle is repeated continuously during operation, thereby minimizing the re-entry of ammonia in solution in the second condenser and enhancing the ammonia degasification from the second condenser to the external atmosphere.

If desired, another or intermediate condenser may be interposed between the main and the second condensers.

The above and other objects are effected by the invention as will be apparent from the following description and claims taken in connection with the accompanying drawings, forming a part of this application, in which:

FIGURE 2 is an enlarged elevational view of that portion of the feedwater system in FIGURE 1 wherein the invention is incorporated.

Figure 1:
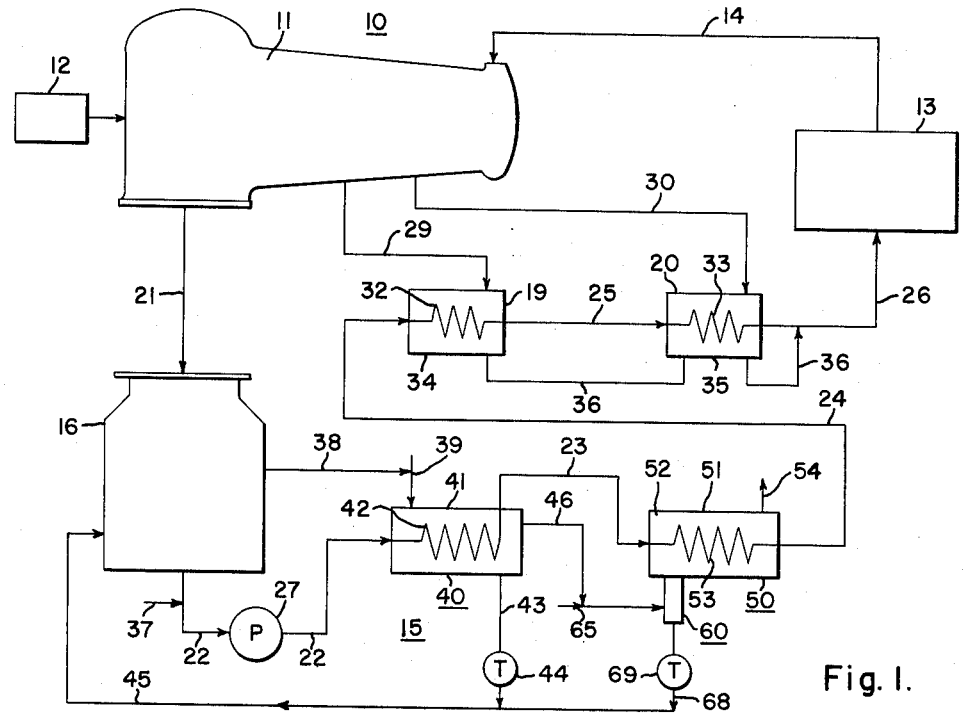
FIGURE 1 is a diagrammatic view of a steam turbine power plant having a degasifying arrangement incorporated in the steam generator feedwater system in accordance with the invention.

Referring to the drawings in detail, in FIGURE 1 there is shown a steam turbine power plant of the condensing and regenerative feedwater heating type generally designated 10 and including a steam turbine unit 11 drivingly connected to a suitable load 12, for example an electrical generator, and a steam generator 13 for providing pressurized motive steam to the turbine 11 through a suitable supply conduit 14. After expansion in the turbine 11, the exhaust steam is returned as feedwater to the steam generator 13 by a feedwater system 15 having a main condenser 16 for condensing the exhaust steam, thereby completing the closed loop circuit for the power plant.

In addition thereto, the feedwater system 15 may further include, if so desired, suitable regenerative feedwater heating apparatus including a first feedwater heater 19 and a second feedwater heater 20 for heating the feedwater before admission or return to the steam generator 13.

As well known in the art, the exhaust steam from the steam turbine unit 11 is directed into the main condenser 16, as indicated by the arrow 21, and is condensed therein by suitable heat exchange with a coolant such as water (not shown), and the condensate thus formed in the main condenser 16 is then returned to the steam generator 13 as feedwater through conduit structure generally designated 22, 23, 24, the feedwater heaters 19 and 20 and conduit structure 25 and 26. A suitable pump 27 may be employed to pressurize the feedwater to a suitably high value for employment in the steam generator 13.

As the feedwater flows through the feedwater heaters 19 and 20, it is heated to successively higher values by steam extracted from the turbine 11 at suitable expansion points, as indicated by the extraction conduits 29 and 30. The feedwater heaters 19 and 20 may be of the well-known tube and shell type, wherein the feedwater is directed through heat exchange tubes indicated at 32 and 33, disposed within suitable shell structures 34 and 35, respectively, and the steam is admitted to the shells 34 and 35. During such heat exchange, the extraction steam admitted to the feedwater heaters 19 and 20 is condensed and is returned to the feedwater heater conduit 26 by suitable conduit structure 36, in a manner well-known in the art.

To control the pH value of the steam generator feedwater, it is currently accepted practice to employ suitable chemical compounds such as amines. These amines may be inserted into the feedwater system at a point upstream of the feedwater pump 27, as indicated by the arrow 37. Although these amines have several beneficial effects in the power plant feedwater and steam generating system, such as minimization of scale formation and neutralization of the water, they have a tendency to break down and liberate ammonia gases. The presence of the ammonia gases in the steam and/or in solution with the steam generator feedwater is highly undesirable because of its corrosiveness.

Also, as well-known in the art, during the formation of steam in the steam generator 13 and flow of the steam through the power plant some incondensible gases, such as air, become entrained in the steam and/or feedwater system which is highly undesirable and is removed from the system, preferably during the condensation of the exhaust steam in the main condenser 16 (for example), as indicated by the vent conduit 38.

In accordance with the invention, the feedwater system 15 is arranged in a manner to vent the ammonia from the system during its flow therethrough so that a minimum amount of ammonia is returned to the steam generator 13. To assist in removal of the air and ammonia from the main condenser 16, there is provided a suitable steam assisted ejector 39. The air, ammonia and steam mixture issuing from the steam ejector 39 is directed into an intermediate condenser 40 to recover some of the entrained steam as condensate and liberate the air and the ammonia gases from the mixture.

The intermediate condenser 40 is effective to condense only a portion of the steam, thereby to minimize the tendency of the ammonia to re-enter into solution, and is of the well-known tube and shell type including a suitable shell structure 41 within which is disposed a suitable heat exchange tube structure 42 connected to the feedwater conduits 22 and 23. The comparatively ammonia-free condensate formed in the intermediate condenser 40 is returned to the main condenser 16, to rejoin the feedwater circuit, through a suitable conduit structure 43 having a steam trap 44 interposed therein and a return conduit 45 connected to the main condenser 16.

The thus liberated mixture of air, ammonia gases and entrained steam are removed from the condenser 40 through a suitable vent 46 when a second stage of compression is accomplished, bringing the pressure to very slightly above atmospheric.

Figure 3:
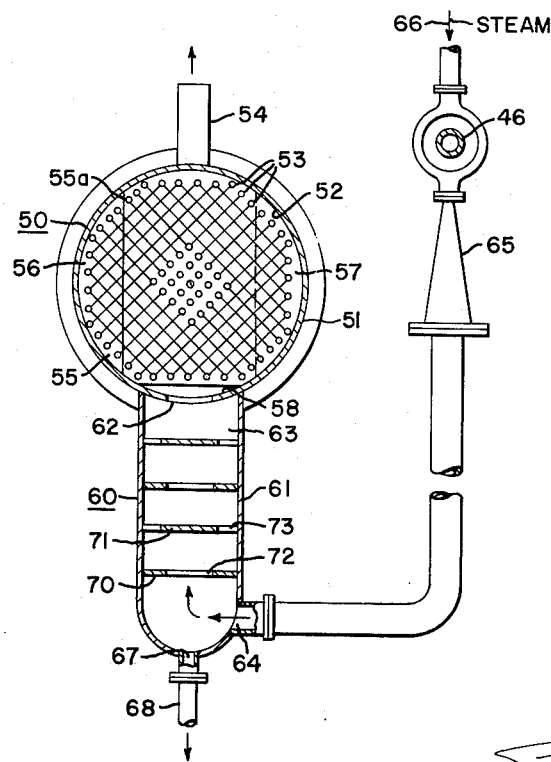
FIGURE 3 is a further enlarged transverse sectional view taken on line III—III of FIGURE 2.

Accordingly, there is provided an after condenser 50 of the tube and shell type for further condensing and recovering the steam from the mixture vented at 46. The condenser 50, as best shown in FIGURE 3, is provided with a tubular shell structure 51 forming a chamber 52 and having a plurality or bundle of heat exchange tubes 53 disposed in communication with the feedwater conduit structure 23 and 24 (see FIGURES 1 and 2), so that the feedwater during its flow through the tube bundle 53 acts as the coolant for, and is concomitantly heated by the vapor in the mixture directed to the chamber 52. The after condenser 50 is further provided with a suitable vent tube 54 for venting air and ammonia from the system to a region of lower pressure, such as the atmosphere.

The after condenser 50 is provided with a plurality of similarly shaped baffle plates 55 and 55a extending transversly to the tubes 53 and alternately reversed and positioned in such a manner that connecting flow passages 56 and 57 are alternately formed by the baffles and the shell structure 51, thereby effecting flow of the mixture in a tortuous or serpentine path from one end of the condenser to the other. Also, the baffles 55 and 55a are cut away at the lower portions to provide a drain collecting portion 58 for collecting the condensate formed in the chamber 52.

To insure that substantially all of the ammonia gases are vented from the feedwater system and that a minimum of steam is vented to the atmosphere through the vent tube 54 with the ammonia and the air, there is provided a degasifying structure 60.

As best shown in FIGURE 3, the degasifying structure 60 includes a tubular shell 61 extending in generally vertical direction and disposed below the after condenser 50. The shell 61 is provided with an outlet 62 at its upper end, thereby affording communication between the vertical flow passage 63 formed by the shell 61 and the drain collecting portion 58 of the after condenser 50. Adjacent its lowermost end, the shell structure 61 is provided with an inlet opening 64. The heated mixture of air, ammonia gas and steam from the vent 46 is directed through a second suitable steam assisted ejector 65 actuated by a suitable supply of steam, as indicated by arrow 66, through the inlet 64 into the flow passage 63. Also, the lowermost end of the shell structure 61 is provided with a drain outlet 67 preferably connected by a suitable conduit 68 to the return conduit 45. A suitable steam trap 69 is interposed in the conduit 68.

Within the shell 61 there is provided suitable fluid dispersing structure, for example, a vertically spaced array of horizontally disposed perforated baffles 70 and 71. As illustrated, the baffle members 70 are of annular shape with central apertures 72 while the baffles 71 are of disc shape and jointly with the shell 61 define annular passages 73.

In operation, the steam ejector 65 is effective to assist in the withdrawal of air, ammonia gas and some steam from the intermediate condenser 40 through the vent 46 and to admit this steam together with the additional and hotter steam 66 to the degasifying structure 60. As the incoming heated mixture flows upwardly through the flow passageway 63 of the degasifying structure into the after condenser 50, it is subjected to heat exchange with the feedwater flowing through the tube bundle 53 with substantial condensation of the steam which condenses and falls in the condenser chamber 52 as a fine mist or rain. Hence, although the liberated air is readily vented through the vent 54 as well as some ammonia gas, a substantial amount of the ammonia is returned to solution with the falling subcooled condensate and drops to the bottom of the condenser 50 into the drain collecting portion 58. The thus collecting condensate with ammonia in solution then gravitates towards the opening 62 and falls through the passage 63 in the degasifier structure 60. During its fall therethrough it is dispersed by the baffles 70 and 71 or divided into thin cascading streams so that as the heated mixture of steam, air and ammonia flows upwardly through the apertures 72 and 73, comingling of the downwardly falling streams and the upwardly rising mixture is enhanced and intimate heat exchange between the two is obtained.

Since the two flows are in counter-flow relation with each other, the falling condensate becomes thoroughly heated to near the saturation temperature, thus liberating the ammonia from the condensate, which then, in a substantially purified state, falls to the bottom of the flow passage 63 and is drawn off through the drain conduit 68. The thus liberated ammonia gas is thus continuously returned to the after condenser 50 for final liberation therefrom. Hence, as the rising flow through the after condenser 50 becomes more and more enriched with ammonia, the relative percentage of ammonia that re-enters into solution with the condensate forming in the after condenser 50 decreases accordingly and the venting of the thus liberated ammonia gases in the after condenser 50 through the vent 54 is enhanced. Since the ammonia concentration in the condenser 50 is relatively high, the amount of steam that is unavoidably lost to the system through the vent 54 is minimized.

The steam trap 69 is effective to insure that no steam or gases from the degasifier structure 60 are returned to the feedwater conduit 45. Hence, this further assures that none of the ammonia gas is returned to the feedwater system. To state this effect in another manner, for clarity, the back-and-forth flow of the ammonia from the degasifier 60 to the after condenser 50 is controlled by the degasifier somewhat in the manner of a check valve. That is, the degasifier 60 permits downward flow of the condensate through its drain outlet 67 but prevents flow of ammonia therethrough, while readily permitting the upward flow of the ammonia gases to the condenser 50. The condenser 50 on the other hand, is effective to vent the liberated ammonia gas through the vent 54 and to permit only return of condensate together with any ammonia in solution to the degasifier 60.

It will now be seen that the invention provides a highly efficient, yet simple arrangement for removing gases readily soluble in the condensate from a steam generator feedwater system. Although in the description and explanation above, the water soluble gas "ammonia" has been mentioned with regard to the scheme of operation, it will be understood that the apparatus is equally effective for removal of any other gas that is readily soluble in the condensate.

It will further be seen that the invention provides a highly improved arrangement for venting ammonia from the feedwater system of a steam power plant with a minimum loss of steam from the system.

Furthermore, if desired, the intermediate condenser 40 may also be provided with the degasifier structure 60 with beneficial results.

Although only one embodiment of the invention has been shown, it will be obvious to those skilled in the art that it is not so limited, but is susceptible of various other changes and modifications without departing from the spirit thereof.

We claim as our invention:

1. Apparatus for removing gases readily soluble in water from steam generator feedwater in a steam turbine power plant comprising
    a first condenser,
    a steam assisted ejector for withdrawing said gases from said first condenser, thereby forming a heated gas and steam mixture,
    a second condenser having a vent,
    a degasifying structure disposed below said second condenser,
    said degasifying structure having an inlet in communication with said ejector and an outlet disposed above said inlet and in communication with said second condenser, whereby said heated mixture flows upwardly through said degasifying structure into said second condenser,
    said second condenser being effective to condense at least a portion of the steam in said mixture and vent the thus liberated soluble gases,
    said second condenser having a lower portion effective to drain the condensate and gases in solution through said inlet to said degasifying structure in counter-flow relation to the incoming heated mixture, whereby the gases in solution are reheated and liberated from the condensate and returned to said second condenser, and said condensate is substantially purified.

2. The structure recited in claim 1, in which said degasifying structure comprises
    a tubular casing defining an upwardly extending flow passage communicating with the inlet and the outlet, and
    means disposed in said passage to disperse and promote intermingling of the heated mixture with the condensate.

3. The structure recited in claim 2, in which the dispersing means comprises
    a plurality of vertically spaced perforated baffle plates, and
    the tubular casing is provided with a second outlet disposed below the inlet for draining the purified condensate.

4. The structure recited in claim 1 and further including
    conduit means for directing feedwater through said second condenser as a coolant, and
    means for directing the purified condensate to said feedwater conduit means.

5. Apparatus for removing gases readily soluble in water from feedwater for a steam generator in a steam turbine power plant, comprising
    a main condenser for condensing exhaust steam to provide feedwater,
    an intermediate condenser,
    an after condenser having a condenser drain collecting portion and a vent,
    means for withdrawing said soluble gases from said main condenser and directing said gases to said intermediate condenser to at least partially condense and remove vapor entrained with said gases,
    a steam assisted ejector for withdrawing said gases from said intermediate condenser, thereby forming a heated gas and steam mixture,
    a degasifying structure disposed below the condensate drain portion of said after condenser,
    said degasifying structure having an inlet communicating with said ejector and an outlet disposed above said inlet and communicating with said drain portion, whereby said heated mixture flows upwardly through said degasifying structure and into said after condenser,
    said after condenser being effective to cool and condense at least a portion of the steam in said mixture and vent the thus liberated soluble gases,
    said drain portion being effective to drain the cool condensate and gases in solution gravitationally through said inlet to said degasifying structure in downwardly directed counter-flow relation to the upward flow of the incoming heated mixture,
    means in said degasifying structure for dispersing the cool condensate and gases in solution, whereby the gases in solution are reheated and liberated from the condensate and returned to said after condenser for venting, and said condensate is substantially purified, and
    means for removing the substantially purified condensate from said degasifying structure.

6. The structure recited in claim 5 and further including
    conduit structure for directing the feedwater through said intermediate and after condensers as a coolant, and
    means for directing the purified condensate to said feedwater conduit structure.

7. The structure recited in claim 5 in which
    said dispersing means comprises a plurality of vertically spaced baffle members, and further including
    conduit structure for directing the feedwater through said intermediate and after condensers as a coolant, and
    means for directing the purified condensate from said degasifying structure to said feedwater conduit structure upstream of said after condenser.

8. The method of removal of ammonia gas from a steam generator feedwater system wherein exhaust vapor is condensed by a main condenser to provide feedwater for a steam generator, which comprises
    employing steam to withdraw a mixture of incondensible gas and ammonia from said main condenser,
    cooling said mixture in a second condenser to condense at least a portion of said steam to form condensate and release the incondensible gas and at least part of the ammonia gas with attendant re-entry of some ammonia gas into solution with the condensate, removing said condensate from said second condenser and reheating the condensate to release ammonia gas that has re-entered into solution, returning the ammonia gas released from the reheated condensate to said second condenser, and venting the ammonia gas from the second condenser together with the incondensible gas.

9. The method of removal of ammonia gas from a steam generator feedwater system wherein exhaust vapor is condensed by a main condenser to provide feedwater for a steam generator, which comprises employing steam to withdraw incondensible gas and ammonia from said main condenser as a heated mixture, cooling said heated mixture in a second condenser with the feedwater to condense said steam into condensate and release the incondensible gas and at least a first part of the ammonia with attendant re-entry of residual ammonia into solution with the condensate, removing said condensate from said second condenser and reheating the condensate to its saturation temperature with steam to release any residual ammonia that has re-entered into solution, combining the residual ammonia with the first part of ammonia and the released incondensible gas, venting the combined ammonia and incondensible gas from the system, and directing the condensate to the feedwater.

10. The method of removal of ammonia gas from a steam generator feedwater system wherein exhaust vapor is condensed by a main condenser to provide feedwater for a steam generator, which method comprises employing steam to withdraw a first mixture of incondensible gas and ammonia from said main condenser, cooling said first mixture in a second condenser to condense at least a portion of said steam and provide substantially purified condensate and to release the incondensible gas and the ammonia gas, returning the purified condensate to the feedwater system, employing steam to withdraw and heat the released incondensible gas and ammonia, thereby forming a second mixture, sub-cooling said second mixture in a third condenser to condense the steam with attendant re-entry of some ammonia into solution with the condensate, removing the condensate from the third condenser and reheating the condensate with said second mixture to release any ammonia gas that has re-entered into solution, returning the thus released ammonia to said third condenser, and venting the ammonia gas from the system together with the incondensible gas.

References Cited by the Examiner

UNITED STATES PATENTS 2,144,692  1/39  Schuftan _____ 55—51
2,626,005  1/53  Sebald _____ 55—39

REUBEN FRIEDMAN, *Primary Examiner*.